United States Patent [19]

Campbell

[11] 3,869,414
[45] Mar. 4, 1975

[54] WAX EMULSIONS CONTAINING PROTEINACEOUS EMULSIFIERS

[75] Inventor: Craig C. Campbell, Cherry Hill, N.J.

[73] Assignee: Mobil Oil Corporation, New York, N.Y.

[22] Filed: Dec. 22, 1969

[21] Appl. No.: 887,413

[52] U.S. Cl.................... 260/6, 260/28, 260/29.3, 106/272, 106/271, 252/311.5
[51] Int. Cl............................................. B01j 13/00
[58] Field of Search ......... 252/311, 356, 8.6, 311.5; 106/270, 271, 272; 260/28.5, 6, 29.6, 29.3

[56] References Cited
UNITED STATES PATENTS

| 1,549,436 | 8/1925 | Billinghame | 252/311.5 |
| 2,104,077 | 1/1938 | Groskopf | 252/311.5 |
| 2,567,433 | 9/1951 | Heijmer | 260/29.4 |
| 2,620,316 | 12/1952 | Ritson | 260/6 |

OTHER PUBLICATIONS

Bennett Practical Emulsions, Chemical Publishing Co., Inc., Brooklyn, N.Y., (1943), p. 443.

Primary Examiner—John D. Welsh
Attorney, Agent, or Firm—Charles A. Huggett; Benjamin I. Kaufman; Raymond W. Barclay

[57] ABSTRACT

Aqueous wax emulsions are provided comprising a proteinaceous emulsifier, a clay and a urea-formaldehyde resin. Also provided are articles of manufacture comprising cellulosic materials containing the aforementioned wax emulsion as a coating or waterproofing agent.

5 Claims, No Drawings

WAX EMULSIONS CONTAINING PROTEINACEOUS EMULSIFIERS

BACKGROUND OF THE INVENTION

I. Field of the Invention

This invention relates to wax emulsions and, in one of its aspects, relates more particularly to wax emulsions having specific utility as coating or waterproofing agents, for example, in the manufacture of articles comprised of cellulosic materials, such as particle board or other materials of construction, as well as having utility for such purpose in a wide variety of industrial applications.

II. Description of the Prior Art

Wax emulsions intended for use in such applications as, for example, coating materials for various types of surfaces, particle board manufacture or as waterproofing agents embodied in various types of materials, necessitate a combination of properties which include satisfactory shear stability, pumpability, non-corrosiveness and compatibility with various types of commercially employed resinous materials in a wide variety of applications. Furthermore, the ability to produce wax emulsions possessing the aforementioned properties and, at the same time, having a relatively high wax-solids content, is especially desirable from a standpoint of present-day industrial requirements. Although emulsions have heretofore been produced which may possess some of the aforementioned characteristics, nevertheless, prior to the present invention, no satisfactory wax emulsion has been obtained in which all of the aforementioned desired properties are present.

SUMMARY OF THE INVENTION

In accordance with the present invention, and in accordance with its objects, there are provided new and improved wax emulsions which possess good stability under shearing stress, a relatively high degree of pumpability, non-corrosiveness to mechanical apparatus and compatibility with industrial-type resins, and furthermore, possessing the ability to have incorporated therein a relatively high wax-solids content, namely as high as at least about 50 per cent, by weight, of the total wax emulsion.

In its generic aspects, as more fully hereinafter described, the novel wax emulsions of the present invention comprise, in addition to wax, a proteinaceous emulsifier, a clay, a ureaformaldehyde resin and water. With respect to the individual components employed for producing the novel wax emulsions of the present invention, the wax component is employed in an amount from about 25 to about 70, and preferably from about 45 to about 65 per cent, by weight, of the total quantity of the emulsion. The proteinaceous emulsifier is employed in an amount from about 0.2 to about 10, and preferably from about 0.5 to about 3 per cent, by weight, of the total quantity of the emulsion. The clay component is employed in an amount from about 0.5 to about 10, and preferably from about 1 to about 5 per cent by weight of the total quantity of the emulsion. The urea-formaldehyde resin is employed in an amount from about 0.5 to about 15, and preferably from about 1 to about 5 per cent, by weight, of the total quantity of the emulsion. Sufficient water is employed to balance the formulation.

The waxes employed in preparing the novel emulsion of the present invention are preferably paraffin waxes and may be obtained from various sources such as, for example, from petroleum distillation processes, or may comprise petroleum waxes derived from distillate fractions of crude oils by such processes as solvent dewaxing, chilling, sweating, pressing or deoiling. The paraffin wax may be employed in a form in which normal paraffins predominate, although waxes entirely devoid of normal paraffins may also be employed. In a preferred form, the paraffin waxes employed may possess melting points within the range from about 100° F. to about 200° F. In this respect, paraffin waxes having melting points between about 120° F. and about 150° F. are most desirable, thereby avoiding the formation of emulsions which may possibly cause staining when applied to certain cellulosic surfaces. It should also be noted that the waxes employed in the emulsions of the present invention may include paraffin waxes in combination with microcrystalline waxes, as well as slack wax.

The proteinaceous emulsifier in the novel emulsions of the present invention may be animal or vegetable and may comprise any emulsifier which is amphoteric in nature in order to overcome resin incompatibility normally encountered in other resin-containing wax emulsions. Exemplary of these emulsifiers are protein comprising, or obtained from, soybean, soybean flour, alpha-soy protein, soluble blood, blood albumen, casein, egg albumen, enzymes, gelatin and may also include, if so desired, solubilizers for the protein.

The presence of the clay component is of significant importance with respect to its use in a high solids content wax emulsion. In this respect, as hereinafter discussed, it has been found that the clay imparts shelf stability to the high solids wax emulsions of the present invention. Thus, it has been found that protein wax emulsions having a solids content below 40%, and without containing clay, exhibited good shelf stability. However, protein wax emulsions having a solids content above 40% were found to be unstable and exhibited the presence of a thick cream layer after about 48 hours. In this regard it was found that the presence of the clay eliminated undesirable creaming and imparted good shelf stability. In theory it is believed that upon homogenization the wax and the protein form a protective colloid around each individual clay particle, thus providing improved emulsion stability. Thus it has been found that the clay particles combine with the wax to form a more dense wax-clay-protein complex. The increased density of these particles results in a reduction of particle velocity thus aiding stabilization in terms of Stokes Law. The clays suitable for such use of the present emulsion may be of any nature, and preferably comprise natural clays. Exemplary thereof are industrial Kaolin clays as used for paper coating. Any clay comprising hydrated aluminum silicate ($Al_2O_3 \cdot 2SiO_2 \cdot 2H_2O$) may also be used. Finely divided quartz, feldspar, or mica may also be present along with iron, titanium, calcium, magnesium, potassium, sodium, manganese, copper, sulfur and carbon.

The urea-formaldehyde resin employed in the wax emulsion of the present invention improve the shear stability of the wet system, and after decomposition under heat, furnish free formaldehyde to polymerize the protein. As a result, the protein loses all of its surfactant properties and re-wetting can not occur. The application of wax is thus rendered highly efficient, inasmuch as the clay-resin-wax complex remains on the surface of the cellulosic particles. Penetration of wax into these particles is minimized since the complex is "fixed" by means of protein-urea-formaldehyde polymerization on the cellulosic particle surface. In this manner water resistance is improved. The urea-formaldehyde resin may be employed in any form and in general may comprise any of the commercially available resins of this type. Exemplary thereof are urea-formaldehyde resins having a viscosity of 800–1,200 cps. at 65% solids. Although urea-formaldehyde resins used for wood bonding are preferred, any urea-formaldehyde resin may be suitable based upon characteristics of urea/formaldehyde ratio, degree of prepolymerization, and included catalyst (if any). Urea crystals and/or thiourea may also be present and are within the scope of the present emulsion.

In as far as the cellulosic materials, coated with the novel wax emulsions of the present invention, are concerned, it should be noted that these materials may include wood, paper, pressboard, cotton cloth, cotton tape, gypsum board (cellulosic facings), corrugated board, bagasse, jute, and flax fiber.

The novel wax emulsions of the present invention are applied to the desired surface in any manner which is practical. Such application may be effected by brushing, dipping, by employing any conventional spray equipment or other conventionally known means of application for wax emulsions in general.

DESCRIPTION OF SPECIFIC EMBODIMENTS

The following examples, and comparative data will serve to illustrate the novel wax emulsions of the present invention, their method or preparation and their comparative superiority over other wax emulsions employed for similar purposes.

The emulsions of Examples 1 through 4 in the following Table I, were prepared in 200 gram batches employing a blender. These emulsions were prepared in the following order: (1) the required amount of water was heated to 40° F.; (2) ammonium-hydroxide was added; (3) the proteinaceous material was added in the form of a 30 per cent mixture in water at a temperature of 75° F.; (4) the required amount of wax and oil were mixed and heated to a temperature of 230° F. and added; (5) and the required amount of clay was added at a temperature of 75° F. The blender was operated at high speed for a period of 2 minutes between additions. Final blending was carried out for a period of 5 minutes.

In Examples 5 through 10 of Table I, 2,000 gram batches were prepared employing a two-stage Manton-Gaulin homogenizer. The emulsions of Examples 5 through 10, as exemplified by Example 6, were prepared in the following order:

Step I

A 30 per cent mixture of the proteinaceous material was prepared by employing 70 grams of water, with slow stirring, and then adding 30 grams of powdered proteinaceous material. This mixture was maintained at room temperature (75° F.). The water phase was next prepared for use at an ultimate temperature at 175° F. by employing 677.2 grams of water and heating to a temperature of 140° F. The wax phase was then prepared for use at a temperature at 140° F. by employing 1,157 grams of wax (with oil, if required) and then heating to 140° F. 12.0 grams of ammonia, 41.8 grams of natural clay and 12 grams of the sodium salt of pentachlorophenol were weighed out.

Step II

The aforementioned quantity of water, maintained at 140° F., was placed into a suitable container and the protein mixture and ammonia were added with slow stirring. The aforementioned wax phase was added to the water phase with continued stirring at a temperature of 140° F. Finally, clay and the sodium salt of pentachlorophenol were added with continued stirring.

Step III

The above-described formulation was then subjected to homogenization in a two-stage Manton-Gaulin homogenizer for the equivalent of two passes at 140° F. employing 2,500/500 psi. on the two valves. The formulation was then cooled to a temperature of about 100° to 110° F. by heat exchange. The container was maintained in this condition for 16 hours until cooled to room temperature.

Step IV

To the above-described homogenized basic formulation were added 3 per cent urea-formaldehyde resin, by weight, to the 100 per cent wax formulation from Step III, with slow stirring. A variation of this step, as shown in Example 7, resides in the addition of the urea-formaldehyde resin before homogenization; however in such instance the resulting emulsion exhibits considerably higher viscosity after a periof of 12 to 14 days.

At the conclusion of Step IV, the wax emulsion preparation is complete and may be poured or pumped into a suitable container for storage.

Table I

| EXAMPLE NO. | 1 | 2 | 3 | 4 | 5 | 6 | 7 | 8 | 9 | 10 |
|---|---|---|---|---|---|---|---|---|---|---|
| | | | | | Basic formulation | UF** added | UF in formulation | Anionic emulsifier | Non-ionic emulsifier | Non-ionic emulsifier |
| MATERIAL | | | | | | | | | | |
| 125/127 AMP Paraffin Wax | 59.5 | 49.1 | 48.6 | 46.4 | 57.85 | 57.85 | 57.85 | 57.85 | 57.85 | 57.85 |
| 100" Solvent Refined Paraffinic Neutral Oil | | | | 1.8 | | | | | | |
| Ammonium Hydroxide | | Trace | | | .60 | .60 | .60 | .60 | .30 | .30 |
| Soluble blood at 75°F. | 0.5 | | | | | | | | | |
| Soy Flour | | 1.8 | 1.8 | 1.8 | | | | | | |
| Alpha Soy Protein | | | | | 1.50 | 1.50 | 1.50 | 1.50 | 1.50 | 1.50 |
| Sodium Salt of Pentachlorophenol | | | | | .60 | .60 | .60 | .60 | .30 | .30 |
| Oleic Acid | | | | | | | | 2.00 | | |

Table I — Continued

| EXAMPLE NO. | 1 | 2 | 3 | 4 | 5 | 6 | 7 | 8 | 9 | 10 |
|---|---|---|---|---|---|---|---|---|---|---|
| | | | | Wax Emulsions* | | | | | | |
| Sorbitan Monooleate | | | | | | | | | | .30 |
| Ethylene Oxide Sorbitan Monooleate | | | | | | | | | .30 | |
| UF Resin | | | | | | | 2.00 | | | |
| Clay | | | .6 | 1.8 | 2.09 | 2.09 | 2.09 | 2.09 | 2.09 | 2.09 |
| Water | 40.0 | 49.1 | 49.0 | 48.2 | 37.36 | 37.36 | 35.36 | 35.36 | 37.36 | 37.36 |
| Total | 100.0 | 100.0 | 100.0 | 100.0 | 100.00 | 100.00 | 100.00 | 100.00 | 100.00 | 100.00 |
| Nominal solids, % | 60 | 50 | 50 | 50 | 63 | 63 | 65 | 65 | 63 | 63 |
| pH Tolerance: | | | | | | | | | | |
| Acetic Acid, trace | | | | | good | | | | | |
| Ammonium Hydroxide, trace | | | | | good | | | | | |
| Hand Shear | | | poor | | | good | good | | poor (granular) | |
| Disc Shear, grams | | | | | 3.5 | 1.5 | 1.6 | | | |
| Pump Shear, grams | | | | | 2.1 | .5 | .8 | | | |
| Observations | Creaming poor Stability | | No Creaming in 48 hours | | Good Shelf Stability | | | Poor Shelf Stability Became Viscous in 12 days | | |

*Examples 1–4 made in 200 gram batches in blender. Examples 5–10 made in 2000 gram batches in Manton-Gaulin Homogenizer. All Quantities are in weight percent.

**Urea-formaldehyde resin added after basic formulation cooled overnight: 100 parts wax emulsion wet weight to 3 parts UF resin wet weight added with slow stirring.

As is shown in Examples 1 and 2 of Table I, the emulsions made on the blender exhibited creaming and poor shelf stability. The emulsions of Examples 3 and 4 exhibited good shelf stability when clay was added. However, it will be noted that all of the emulsions of Examples 1 through 4 exhibited poor hand shear.

Upon the addition of the urea-formaldehyde resin, it will be noted from Examples 6 and 7 that the shear stability of the wax emulsion was significantly improved. Hand shear, disc shear and pump shear, as in Examples 6 and 7, exhibited low wax shear-out when compared with Example 5, which comprised the basic formulation but without the presence of the urea-formaldehyde resin. It will be noted, as shown in Example 6, that in order to avoid an increase in viscosity with time, the urea-formaldehyde resin must be added after the basic emulsion has cooled.

The ability of the urea-formaldehyde resin to improve shear stability was quite unexpected. The use of conventional emulsifiers, as shown in Examples 8, 9 and 10, exhibited poor shear stability and poor shelf stability. The ability of the urea-formaldehyde resin to improve the shear stability was even more remarkable for the reason that many additives which are normally considered to be more compatible (such as methanol, ethanol, ethylene glycol and urea) resulted in exhibiting extremely poor shear stability.

Data were next obtained for comparing the water resistance of the novel protein wax emulsion of the present invention in particle board with that of four commercially available standard wax emulsions having different emulsifier systems, as shown in the following Table II. Emulsion system A comprised a cationic emulsion containing 65 per cent, by weight, solids. Emulsion system B comprised an amine soap emulsion containing 60 per cent, by weight, solids. Emulsion system C also comprised an amine soap emulsion containing 65 per cent, by weight, solids. Emulsion system D comprised a gum-type emulsion containing 45 per cent, by weight, solids. Emulsion system E comprised the protein emulsifier of the present invention containing, by weight, 63 per cent solids. The particle boards were made at three levels of net wax solids, viz. 0.75%, 0.50% and 0.35%. In Table II are shown the comparative water resistance and thickness swell data for the protein emulsion of the aforementioned Example 6 of Table I and the aforementioned commercial emulsions A, B, C and D in particle board.

The data of Table II represent computer data based on the sums of squares analysis at a 95% probability level. The particle boards employed comprised single layer homogeneous Douglas fir made with 6 per cent urea-formaldehyde resin solids. The board dimensions were 0.50 inch × 12 inches × 18 inches bonded at 300° F./7 minutes and post-cured at 140° F/3 hours with slow cooling to room temperature. The testing was conducted in accordance with U.S. Specification ASTM-1037-62T and European Specification DIN-52-364.

TABLE II

42#/FT³ COMMON DENSITY DATA FOR WAX EMULSION WATER ABSORPTION AND THICKNESS SWELL RESULTS IN PARTICLE BOARD UP TO 72 HOURS SOAK

| Wax Level, % | Specification | | 0.75 | | | | | 0.50 | | | | | | 0.25 | | | |
|---|---|---|---|---|---|---|---|---|---|---|---|---|---|---|---|---|---|
| | | C Anionic | | D Protein | | E Gum | | A Cationic | | B Anionic | | C Anionic | | D Protein | | E Gum | |
| Emulsifier Type | *W.A.  **T.S. | W.A. T.S. | | W.A. T.S. | | W.A. T.S. | | W.A. T.S. | | W.A. T.S. | | W.A. T.S. | | W.A. T.S. | | W.A. T.S. | |
| 5"x6"  2 Hrs. | ≤15  ≤10 | 3.8 | 4.3 | 3.4 | 3.8 | 3.4 | 3.8 | 4.1 | 5.0 | 3.7 | 4.7 | 3.4 | 3.9 | 3.7 | 4.2 | 4.8 | 5.2 |
| 24 Hrs. | | 13.2 | 8.9 | 14.3 | 8.2 | 11.2 | 7.7 | 13.4 | 9.4 | 13.3 | 9.2 | 12.8 | 8.3 | 14.9 | 9.1 | 12.8 | 8.5 |
| 48 Hrs. | | 23.7 | 11.3 | 20.4 | 11.4 | 20.9 | 9.5 | 26.5 | 13.0 | 24.3 | 11.9 | 23.2 | 10.4 | 31.6 | 12.2 | 24.7 | 10.6 |
| 72 Hrs. | | 34.7 | 13.2 | 27.9 | 13.4 | 29.9 | 11.4 | 41.8 | 15.3 | 27.3 | 13.6 | 33.1 | 12.5 | 41.3 | 14.0 | 34.3 | 12.4 |
| 1"x1"  2 Hrs. | | 6.6 | 4.2 | 6.4 | 3.6 | 6.5 | 4.2 | 7.8 | 4.9 | 7.6 | 3.9 | 6.6 | 3.7 | 7.8 | 4.6 | 7.9 | 3.4 |
| 24 Hrs. | | 23.3 | 11.5 | 21.8 | 9.7 | 26.1 | 9.7 | 24.0 | 13.1 | 23.5 | 11.4 | 22.8 | 10.7 | 23.7 | 11.5 | 24.1 | 9.7 |
| 48 Hrs. | | 35.4 | 15.6 | 33.0 | 13.0 | 31.6 | 11.7 | 35.5 | 17.0 | 35.4 | 14.7 | 34.2 | 13.8 | 34.7 | 14.9 | 34.7 | 12.7 |
| 72 Hrs. | | 49.5 | 17.7 | 46.6 | 15.0 | 42.9 | 13.4 | 49.0 | 19.1 | 43.5 | 16.6 | 47.6 | 15.4 | 48.8 | 16.8 | 45.8 | 13.9 |

| Wax Level, % (cont.) | 0.25 (cont.) | | | | | | | | | |
|---|---|---|---|---|---|---|---|---|---|---|
| | Cationic | | B Anionic | | C Anionic | | D Protein | | E Gum | |
| Emulsifier Type | W.A. T.S. | | W.A. T.S. | | W.A. T.S. | | W.A. T.S. | | W.A. T.S. | |
| 5"x6"  2 Hrs. | 5.8 | 5.6 | 6.4 | 7.3 | 4.4 | 4.5 | 4.1 | 4.3 | 4.6 | 4.4 |
| 24 Hrs. | 15.5 | 11.0 | 20.5 | 13.9 | 13.7 | 9.0 | 15.1 | 9.0 | 13.7 | 9.2 |
| 48 Hrs. | 28.0 | 13.6 | 30.5 | 16.2 | 24.8 | 10.8 | 32.6 | 12.0 | 23.2 | 11.2 |
| 72 Hrs. | | | | | 35.9 | 12.8 | 42.1 | 13.7 | 34.4 | 13.7 |
| 1"x1"  2 Hrs. | 12.2 | 4.8 | 11.2 | 5.6 | 9.5 | 4.1 | 8.7 | 5.1 | 9.9 | 3.7 |
| 24 Hrs. | 30.8 | 14.1 | 30.2 | 16.6 | 26.9 | 11.0 | 25.3 | 12.7 | 28.5 | 10.9 |
| 48 Hrs. | 41.1 | 17.6 | 44.1 | 20.5 | 38.0 | 13.9 | 36.4 | 15.1 | 39.1 | 14.0 |
| 72 Hrs. | 52.7 | 19.5 | 62.3 | 22.8 | 51.3 | 15.4 | 50.6 | 17.0 | 50.2 | 15.3 |

\* Water Absorption
\*\* Thickness Swelling

From the foregoing data of Table II it will be noted that the protein wax emulsions of the present invention compared satisfactorily with commercial wax emulsions in particle board water resistance. It will also be noted that both water absorption and thickness swell data obtained were within specific requirements even on the 0.35% wax level.

Although the present invention has been described with preferred embodiments, it will be understood that various modifications and adaptations thereof may be resorted to without departing from the spirit and scope of the invention.

What is claimed is:

1. An emulsion suitable for use as a coating or waterproofing agent consisting essentially of, by weight, from about 25 to about 70 percent wax, from about 0.2 to about 10 percent of an amphoteric proteinaceous emulsifier, from about 0.5 to about 10 percent of a clay, from about b 0.5 to about 15 percent of an urea-formaldehyde resin and water in an amount sufficient to form the emulsion.

2. An emulsion as defined in claim 1 comprising, by weight, from about 45 to about 65 per cent wax, from about 0.5 to about 3 per cent amphoteric proteinaceous emulsifier, from about 1 to about 5 per cent clay, from about 1 to about 5 per cent urea-formaldehyde resin and water in an amount sufficient to form the emulsion.

3. An emulsion as defined in claim 1 wherein said wax is selected from the group consisting of petroleum and natural waxes.

4. An emulsion as defined in claim 1 wherein said clay comprises a natural clay.

5. An emulsion as defined in claim 1 wherein said amphoteric proteinaceous emulsifier comprises an alpha-soy protein.

* * * * *

UNITED STATES PATENT AND TRADEMARK OFFICE
CERTIFICATE OF CORRECTION

PATENT NO. : 3,869,414

DATED : March 4, 1975

INVENTOR(S) : CRAIG C. CAMPBELL

It is certified that error appears in the above-identified patent and that said Letters Patent are hereby corrected as shown below:

| | |
|---|---|
| Column 3, line 36 | "or" should read --of--. |
| Column 3, line 43 | "40°F" should read --140°F--. |
| Column 4, line 47 | "periof" should read --period--. |
| Column 6, Table I (Continued) | ".30" under Column 10 should be under Column 9. |
| Column 9, Claim 1 Line 20 | Delete "b" before 0.5. |

Signed and Sealed this second Day of December 1975

[SEAL]

Attest:

RUTH C. MASON
*Attesting Officer*

C. MARSHALL DANN
*Commissioner of Patents and Trademarks*